Jan. 6, 1942.  G. A. GOEPFRICH  2,269,261
BRAKE
Filed Feb. 28, 1940  2 Sheets-Sheet 1

INVENTOR.
GEORGE A. GOEPFRICH
BY
ATTORNEY.

Jan. 6, 1942.   G. A. GOEPFRICH   2,269,261
BRAKE
Filed Feb. 28, 1940   2 Sheets-Sheet 2

INVENTOR.
GEORGE A. GOEPFRICH
BY
M. W. McConkey
ATTORNEY.

Patented Jan. 6, 1942

2,269,261

UNITED STATES PATENT OFFICE 2,269,261

BRAKE

George A. Goepfrich, South Bend, Ind., assignor to Bendix Aviation Corporation, South Bend, Ind., a corporation of Delaware Application February 28, 1940, Serial No. 321,191

11 Claims. (Cl. 188—79.5)

This invention relates to brakes, and is illustrated as embodied in an internal expanding automobile brake.

An object of the invention is to provide an adjustment which will shift the released position of the brake friction means to compensate for wear, in combination with a brake anchorage which gradually expands the friction means in released position as its position is so shifted, in such a manner as to preserve a uniform clearance in the brake regardless of wear.

Another object is to provide a simple adjustment device having a rack turning a pinion locked by means such as a spring pawl, thereby giving a very fine adjustment.

The above and other objects of the invention, and various novel features, including the combination of a spring centralizer with the described adjustment, will be apparent from the following description of the illustrative embodiments shown in the accompanying drawings, in which.

Figure 1:
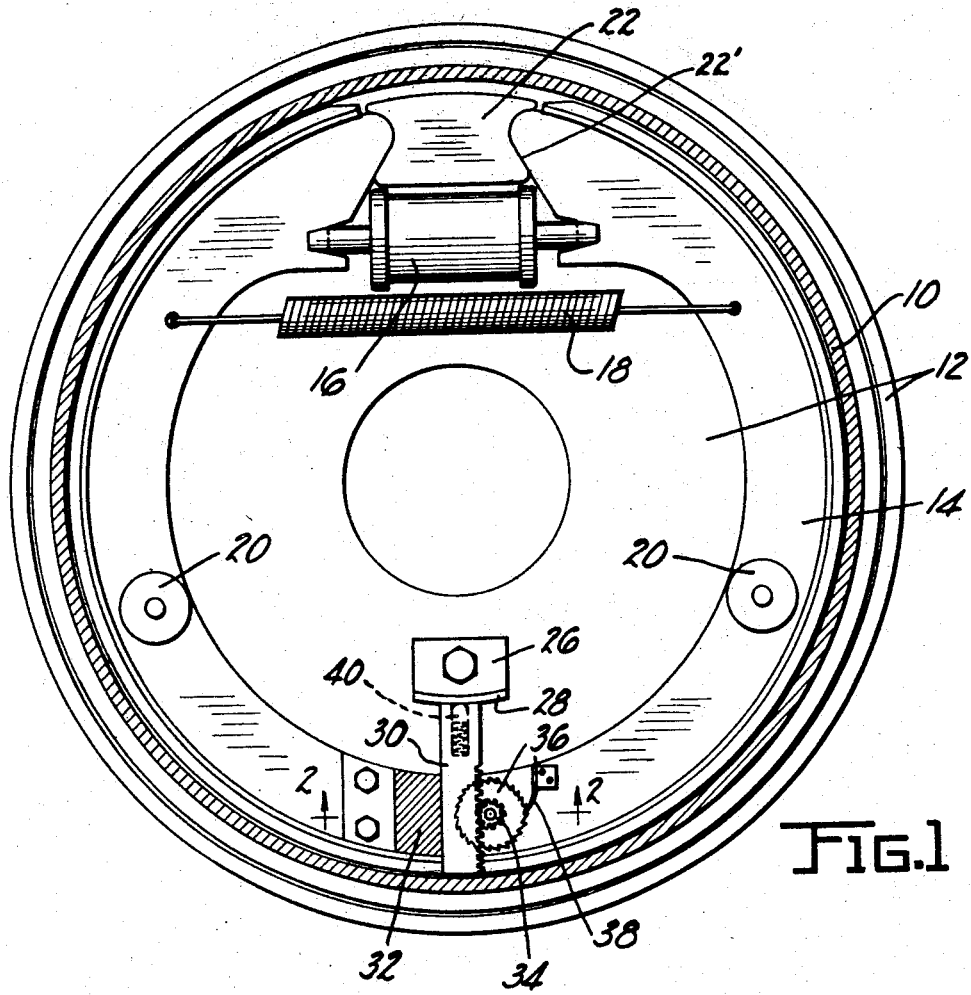
Figure 1 is a section through a brake embodying one form of the invention, in a plane just inside the head of the brake drum, and showing the brake shoes in side elevation.
Figure 2:
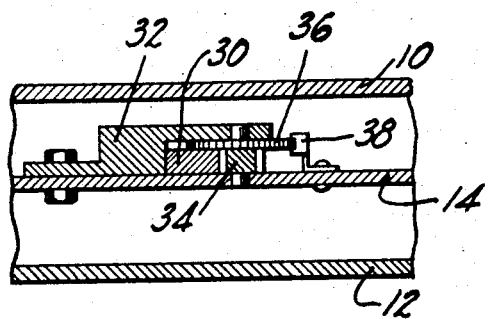
Figure 2 is a partial section on the line 2—2 of Figure 1.

Figures 1 and 2 illustrate a brake having a rotatable drum 10, at the open side of which is a support such as a backing plate 12. Within the drum is a resilient expansible friction band or shoe 14 arranged to be spread to apply the brake by suitable means such as a wheel cylinder 16 acting against the resistance of a return spring 18. The shoe 14 is provided with suitable steady rests 20.

The upper ends of the shoe 14 are arranged for engagement with a fixed anchor block 22 secured to the backing plate 12. The shoe ends are rounded to seat in sockets formed in the sides of the block. The lower faces of these sockets diverge somewhat, as seen at 22', so that as the shoe ends are forced downwardly by the automatic adjustment described below they are spread apart sufficiently to compensate for the wear causing the adjustment, thereby to preserve the clearance between the shoe and drum uniform.

The lower portion of the backing plate is provided with a stop in the form of a fixed bracket 26 having a stop flange 28 curved to parallel the brake drum. The flange 28 is engaged, when the brake is released, by the inner end of a plunger 30, mounted for lengthwise movement between the shoe web and a guide 32 secured to the shoe web. The plunger 30 moves radially of the shoe, and its outer end extends through alined openings in the shoe rim and the brake lining, the extreme end being flush with the brake lining, and being arranged to engage the drum when the brake is applied. Thus the brake drum pushes the plunger 30 radially inward as the brake lining wears.

One edge of the plunger 30 is formed with rack teeth meshing with a small pinion 34 rigid with a ratchet wheel 36, the pinion and ratchet wheel unit being journaled in bearings provided by alined openings in the shoe web and the guide 32. The teeth on the ratchet wheel 36 are yieldingly engaged, to prevent retrograde movement, by holding means such as a spring pawl 38 secured to the shoe web.

It will be seen that as the plunger 30 is gradually pushed radially inward, pawl 38 prevents it from jarring out again. The friction of the parts holds it sufficiently against unintended inward movement. The size of the ratchet wheel 36 gives a very fine adjustment. A spring-pressed plunger 40 keeps the parts at all times lightly loaded, insuring that a tooth of ratchet 36 is seated against the pawl 38.

Figure 3:
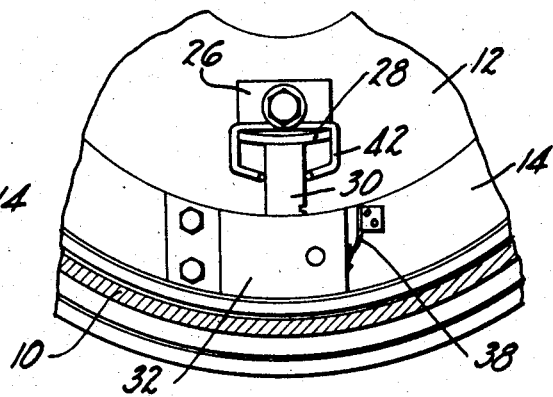
Figure 3 is a view corresponding to the lower part of Figure 1, but showing the addition of a centering spring.

As shown in Figure 3, a centering spring 42 may be looped over the flange 28, with parts gripping the plunger 30 between them and yieldingly resisting movement of the plunger in either direction. This centers the shoe when the brake is released.

Figure 4:
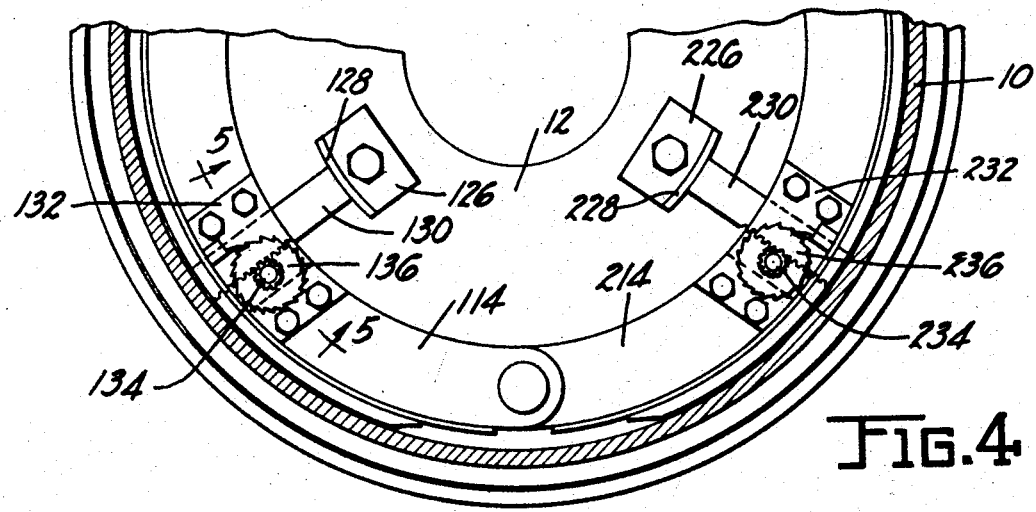
Figure 4 is a partial section corresponding to the lower part of Figure 1, but showing a modification having two pivotally-connected shoes.
Figure 5:
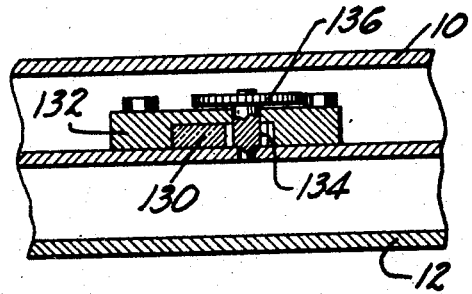
Figure 5 is a partial section on the line 5—5 of Figure 4.

In Figures 4 and 5, instead of a single resiliently flexible shoe there are two pivotally connected shoes 114 and 214. These are provided with automatically adjusted stop plungers 130 and 230, engageable with the flange 128 and 228 of bracket 126 and 226, moving in guides 132 and 232, and having teeth meshing with pinions 134 and 234 rigid with ratchet wheels 136 and 236 held by spring pawls as described above.

Figure 7:
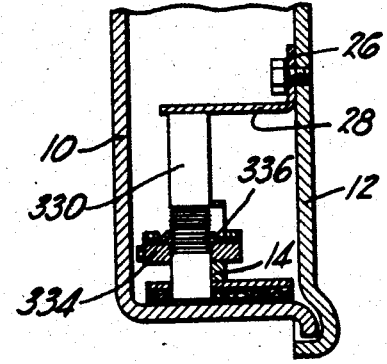
Figures 6, 7 and 8 are respectively a view corresponding to Figure 3, a partial radial section through the lower part of the brake, and a section on the line 8—8 of Figure 6, and showing a further modification.
Figure 6:
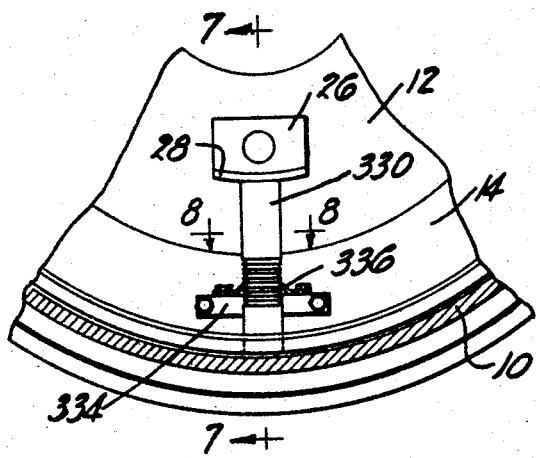
Figure 8:
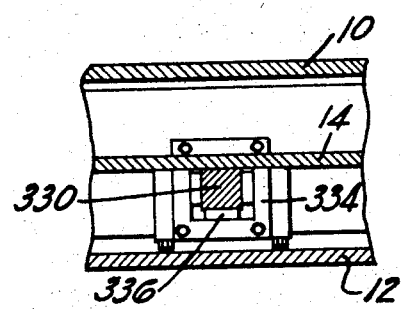

In Figures 6, 7 and 8, the stop flange 28 is engaged by a square-section plunger 330 formed on all four sides with ratchet teeth engaged by spring pawls turned up from a steel plate 336 mounted on a bracket guide 334 secured to the shoe web. The four pawls on the plate 336 are of different lengths such that any movement of the plunger 330 equal to one-fourth of the height of one of the teeth on its side will cause one of the pawls to engage its tooth.

While several illustrative embodiments have been described in detail, it is not my intention to limit the scope of the invention to those particular embodiments, or otherwise than by the terms of the appended claims.

I claim:

1. A brake comprising, for use in combination with a drum, an expansible friction device adapted to anchor at either end thereof, adjustment means having a part actuated by engagement with the drum and means set thereby for determining the position of the friction device in the drum in accordance with wear, and an anchorage formed to cause wear-compensating expansion of the friction device in released position as the position of the friction device is changed by the adjustment means.

2. A brake comprising, for use in combination with a drum, an expansible friction device, adjustment means having a part actuated by engagement with the drum and having means for determining the position of the friction device in the drum in accordance with wear, said means including a pinion driven by a rack controlled by said drum actuated part and a stop establishing the position of one end of said drum actuated part.

3. A brake comprising, for use in combination with a drum, an expansible friction device, automatic adjustment means having a part actuated by engagement with the drum and means set thereby for determining the position of the friction device in the drum in accordance with wear, an anchorage formed to cause wear-compensating expansion of the friction device in released position as the position of the friction device is changed by the adjustment means, and a centralizer acting yieldingly on said means.

4. A brake comprising, for use in combination with a drum, an expansible friction device, automatic adjustment means having a part actuated by engagement with the drum and means set thereby for determining the position of the friction device in the drum in accordance with wear, said means including a pinion driven by a rack actuated by said part, and a centralizer acting yieldingly on the adjustment means.

5. A brake comprising, for use in combination with a drum, an expansible friction device, adjustment means for determining the position of the friction device in the drum in accordance with wear, and an anchorage formed as a cam to cause wear-compensating expansion of the friction device in released position as the position of the friction device is changed by the adjustment means.

6. A brake comprising, for use in combination with a drum, an expansible friction device, adjustment means for determining the position of the friction device in the drum in accordance with wear, an anchorage formed to cause wear-compensating expansion of the friction device in released position as the position of the friction device is changed by the adjustment means, and a resilient centralizer acting yieldingly on said means and tending to hold it on a given radius of the brake.

7. A brake comprising, for use in combination with a drum, an expansible friction device, and an adjustment means for determining the position of the friction device in the drum in accordance with wear, said means including a part actuated by engagement with the drum and including a pinion driven by a rack controlled by said part and a yielding pawl preventing retrograde movement of the pinion.

8. A brake comprising, for use in combination with a drum, an expansible friction device, and an automatic adjustment means for determining the position of the friction device in the drum in accordance with wear, said means including a part actuated by engagement with the drum and including a pinion driven by a rack controlled by said part and a yielding pawl preventing retrograde movement of the pinion.

9. A brake comprising, for use in combination with a drum, an expansible friction device, and a drum actuated automatic adjustment means for determining the position of the friction device in the drum in accordance with wear, said means including a part actuated by engagement with the drum and including a pinion driven by a rack controlled by said part and a yielding pawl preventing retrograde movement of the pinion.

10. A brake comprising, for use in combination with a drum, an expansible friction device adapted to anchor at either end thereof, automatic adjustment means for determining the position of the friction device in the drum in accordance with wear, said means having a part actuated by engagement with the drum and having a member set by the said drum actuated part, and an anchorage formed to cause wear-compensating expansion of the friction device in released position as the position of the friction device is changed by the adjustment means.

11. A brake comprising, for use in combination with a drum, an expansible friction device adapted to anchor at either end thereof, automatic adjustment means for determining the position of the friction device in the drum in accordance with wear, said means having a part actuated by engagement with the drum and having a member set by the said drum actuated part, and an anchorage formed to change the released position of at least one end of the friction device to compensate for changes in the position of the friction device caused by the aforesaid adjustment means.

GEORGE A. GOEPFRICH.